(12) United States Patent
Nagakura

(10) Patent No.: US 7,042,181 B2
(45) Date of Patent: May 9, 2006

(54) METHOD AND SYSTEM FOR CONTROLLING MOTOR TORQUE

(75) Inventor: Takayuki Nagakura, Tokyo (JP)

(73) Assignee: Fuji Electric Systems Co., Ltd., Tokyo (JP)

( * ) Notice: Subject to any disclaimer, the term of this patent is extended or adjusted under 35 U.S.C. 154(b) by 5 days.

(21) Appl. No.: 10/923,087

(22) Filed: Aug. 23, 2004

(65) Prior Publication Data

US 2005/0077853 A1    Apr. 14, 2005

(30) Foreign Application Priority Data

Aug. 25, 2003    (JP)    .................. PA 2003-299792

(51) Int. Cl.
*H02M 5/458* (2006.01)
(52) U.S. Cl. .................. 318/434; 388/903; 318/504
(58) Field of Classification Search ........ 318/432–434, 318/504, 508, 514; 388/903
See application file for complete search history.

(56) References Cited

U.S. PATENT DOCUMENTS

| | | | | |
|---|---|---|---|---|
| 4,575,668 A | * | 3/1986 | Baker | 318/811 |
| 5,195,045 A | * | 3/1993 | Keane et al. | 702/107 |
| 5,659,235 A | * | 8/1997 | Yamada et al. | 318/801 |
| 6,522,098 B1 | * | 2/2003 | Majumdar et al. | 318/801 |
| 6,924,618 B1 | * | 8/2005 | Matsushiro et al. | 318/811 |

FOREIGN PATENT DOCUMENTS

| | | |
|---|---|---|
| EP | 0 899 862 A2 | 3/1999 |
| JP | 05022982 | 1/1993 |
| JP | 05236607 | 9/1993 |
| JP | 2002-218799 | 8/2002 |
| JP | 2003-153575 | 5/2003 |
| JP | 2004173454 | 6/2004 |

* cited by examiner

*Primary Examiner*—Bentsu Ro
(74) *Attorney, Agent, or Firm*—Rabin & Berdo, P.C.

(57) ABSTRACT

A method and system for controlling motor torque provides improved responsiveness and reliability in motor control applications. The motor control system includes a power converter, a voltage detector for detecting the converter input voltage and a control circuit for controlling the converter. The control circuit includes a torque command limit value generator and a torque command limiter for limiting a torque command value. The system may also include a torque command coefficient generator for generating a coefficient corresponding to an input current of the power converter, and a multiplier for calculating a final torque command value for the motor by multiplying together the torque command value and the torque command coefficient. The torque command limit and coefficient values may be determined from the converter input voltage, calculated or detected converter input current and calculated input impedance between a power supply and the converter.

14 Claims, 8 Drawing Sheets

METHOD AND SYSTEM FOR CONTROLLING MOTOR TORQUE

BACKGROUND OF THE INVENTION

1. Field of the Invention

The present invention relates generally motor control systems, and more specifically to motor control system that controls positioning motor torque.

2. Background of the Invention

Motor control systems are used in many applications, including industrial and consumer applications. The control of a motor's position, velocity and/or acceleration is the object of a motor control system, which attempts to position or control the speed of the motor at a commanded rotation, location and/or velocity.

FIG. 8 shows a motor drive control system as is known in the related art. The apparatus includes a power converter 25 such as an inverter for driving a 3-phase alternating-current (AC) motor 27, having a direct-current (DC) power supply 21 as an input, and a control device 100 for controlling the system.

Power converter 25 converts DC power from DC power supply 21 into AC power and supplies it to motor 27. A circuit breaker 23 interrupts the supplied power when there is a failure such as a short-circuit of power converter 25, interrupting the circuit so that excessive current does not flow from DC power supply 21 to power converter 25. A voltage detector 24, such as an instrument transformer detects the input voltage of power converter 25 and a current detector 26, such as a current transformer, detects the output current of power converter 25.

Control device 100, which supplies a drive signal to power converter 25 includes a speed calculating part 3 for determining a speed of motor 27 from a detected position value provided by an encoder 4 mechanically coupled to motor 27. The control device 100 also includes a torque command calculating part 2 for calculating a torque command value for motor 27 from the difference between a speed command value and the speed value determined by speed calculating part 3. An output calculating part 1 is provided for providing feedback control based on the difference between an output current command value for power converter 25 obtained from the torque command value and a detected output current value provided by the current detector 26. Output calculating part 1 then generates a drive signal provided to power converter 25 using the detected input voltage value from voltage detector 24 and the detected position value.

In the system depicted in FIG. 8, considering the input impedance 22 due to the resistance of the wiring between the DC power supply 21 and power converter 25 and other elements, the input voltage $V_1$ and the output power P of power converter 25 are given by the following equations:

$$V_1 = V_0 - R \cdot I \text{ and } P = I \cdot V_1 = I(V_0 - R \cdot I),$$

respectively, where $V_0$ is the output voltage of DC power supply 21, I is the input current of power converter 25; and R is the value of the input impedance 22.

The maximum output power of the system $P_{max}$ is then $V_0^2/4R$ and the values of the input voltage $V_1$ and the input current I at that time are $V_1 = V_0/2$ and $I = V_0/2R$, respectively. From the above expressions it is apparent that input impedance R cannot be ignored, since if the input current is increased, at a certain point a maximum output power is reached. Even if the input current is increased beyond the maximum power point, output power P decreases due to a voltage drop caused by input impedance 22.

The specification for maximum output power level is set in consideration of the above constraints, but when the required output power is greater than the maximum output value $P_{max}$ at a given time, the required torque command value cannot be met by actual torque, and the difference between the output current command value obtained from the torque command value and the detected output current value widens. Consequently, if output-calculating part 1 integrates the difference, the integral term becomes large, and the current control output becomes saturated. As a result the responsiveness of the system falls.

In the related art shown in FIG. 8, when the maximum output value of the power converter 25 is reached, when an output demand such as for further motor acceleration is made, an overcurrent condition typically arises on the input side of power converter 25 and the circuit is broken by circuit breaker 23. The output of the power converter 25 ceases supplying power, and in an apparatus in which continuous operation of the motor 27 is required, the overload condition inevitably results in total system failure.

Known solutions exist to the above-described problem, as exemplified by a system as disclosed in Japanese Patent JP-A-2003-153575. In that system, a control device is included using current control to calculate an output voltage command value by integrating the difference between an output current command value and a detected output current value. The system stops the integral control when the output voltage command value has risen above a predetermined limit value, thereby preventing saturation of current control output accompanying output voltage limitation is disclosed.

However, the above-described solution has disadvantages, as using a predetermined limit value on the output voltage command value, as the current control output can become saturated when the power supply voltage falls. In that condition, the maximum output value of the power converter falls below the maximum output specification, and because the output voltage command value then never reaches the predetermined limit, again causing saturation of the control function and failure of responsiveness of the system.

A second solution provided in another electric motor drive control device wherein control is prevented from becoming unstable when the power supply voltage of a power converting device drops is set forth in Japanese Patent JP-A-2002-218799.

In the system described in the above-referenced Japanese Patent, when the power supply voltage drops and the output voltage of the power converting device becomes saturated, the condition is recognized and the electric motor current is lowered. Thus, the drop in the power supply voltage is suppressed and simultaneously the voltage across output demand lines is suppressed, thereby preventing the current feedback value from failing to follow the current command value.

The above-described second solution also has disadvantages. Although torque limitation during a drop in power supply voltage is possible, the effect of the voltage drop at the converted input that is caused by the input impedance is not considered. Again, as in the case of the related art shown in FIG. 8, continuous operation of the motor is not guaranteed.

Therefore, it would be desirable to provide a motor control system in which a voltage drop due to input impedance or due to a fall in power supply voltage has reduced effect on the responsiveness of the system. If is further desirable to provide a motor control system in which torque control is maintained via an upper limit on power converter output and in which motor operation can be continued without stopping.

SUMMARY OF THE INVENTION

The above objectives of providing for continued operation and responsiveness of a motor control system are achieved in a motor control system and method of operation therefor.

The motor control system includes a power converter having a DC power supply input, a voltage detector for detecting the input voltage of the power converter and a control circuit for controlling the power converter. The control circuit includes a torque command limit value generator for generating a torque command limit value using the detected power converter input voltage and a torque command limiter for limiting a torque command value for the motor. The system may also include a torque command coefficient generator, for generating a torque command coefficient corresponding to an input current of the power converter, and a multiplier for calculating a final torque command value for the motor by multiplying together the torque command value and the torque command coefficient.

As an alternative, the system may include a current detector for detecting the input current of the power converter. The control circuit may then include an impedance calculator for calculating the input impedance between the power supply and the converter. The torque command limit value generator generates the torque command limit value using the detected converter input voltage, the detected converter input current and the calculated input impedance. As a second alternative, the control circuit may include an input current calculator for calculating the input current of the power converter using an output power value and a detected input voltage value of the power converter, without requiring a current detector in the system. An input impedance calculator is provided for calculating an input impedance value between the power supply and the converter using the detected input voltage value and the calculated input current. The torque command limit value generator generates the torque command limit value using the detected converter input voltage, the calculated converter input current and the calculated input impedance and the torque command limiter limits the final torque command value in conformity with the torque command limit value.

A torque command coefficient generator may be used with either of the alternative embodiments described above and the final torque limit value adjusted in accordance with the generated torque command coefficient. Further, in the alternative embodiments, the torque command coefficient may be calculated in conformity with the power converter input voltage, input current and input impedance between the power supply and the converter.

The foregoing and other objectives, features, and advantages of the invention will be apparent from the following, more particular, description of the preferred embodiment of the invention, as illustrated in the accompanying drawings.

DETAILED DESCRIPTION OF THE PREFERRED EMBODIMENTS

The present invention provides a system and method for controlling motor torque that avoids the above-described disadvantages of the prior art.

Figure 1:
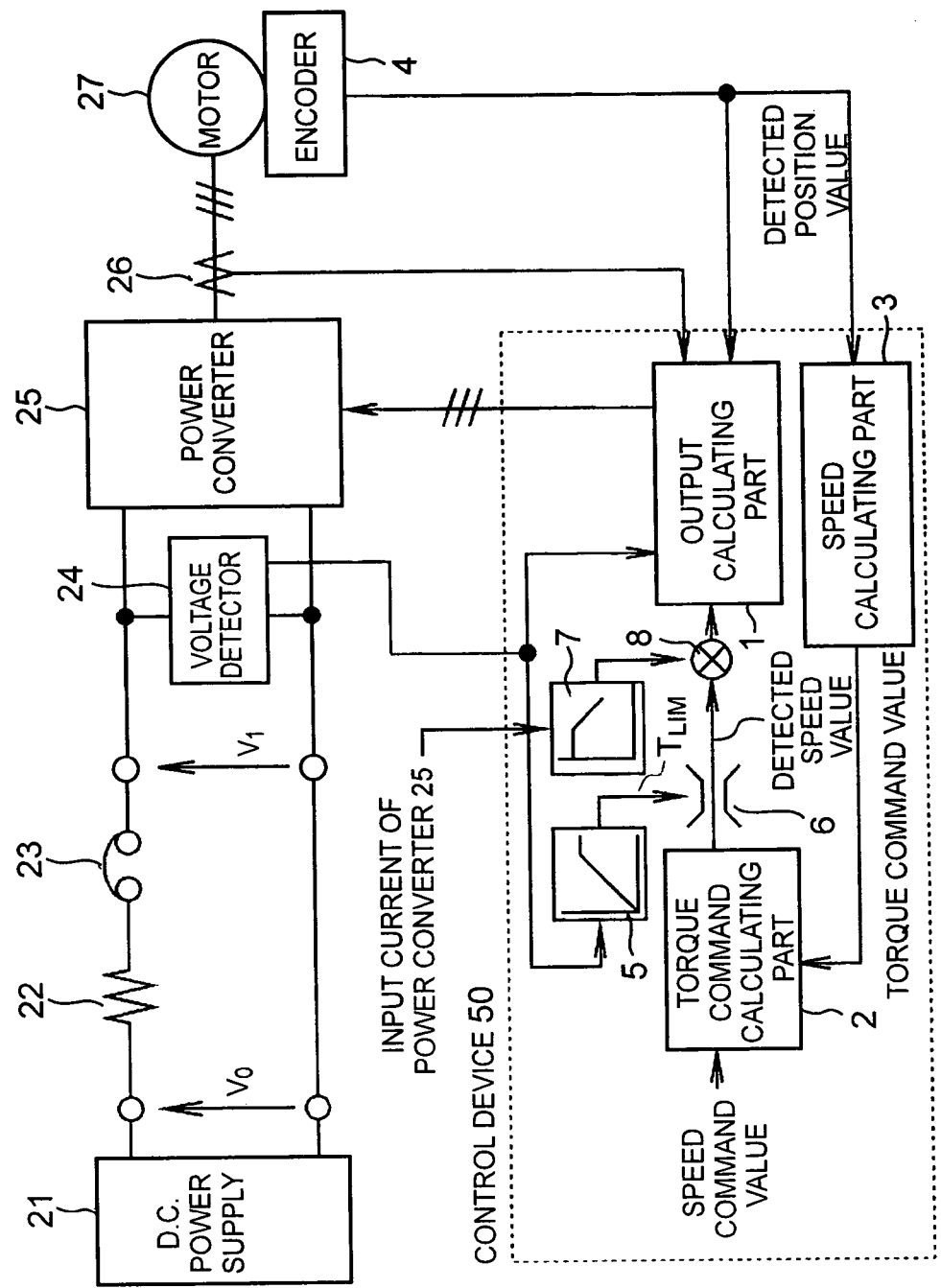
FIG. 1 is a block diagram depicting a motor control system in accordance with an embodiment of the present invention.
Figure 8:
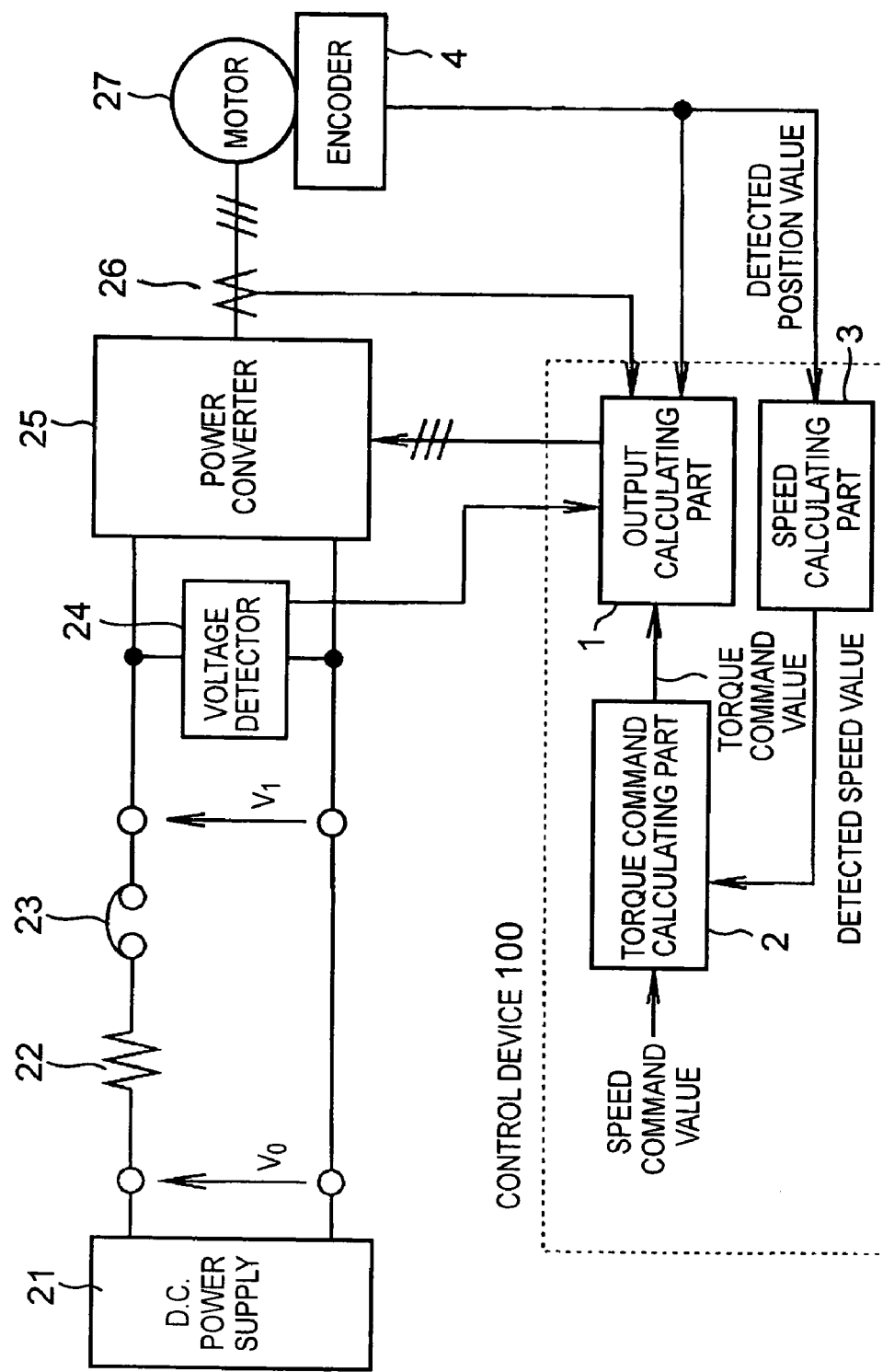
FIG. 8 is a block diagram depicting a prior art motor control system.

FIG. 1 depicts a system in accordance with an embodiment of the present invention that maintains a high responsiveness of torque control even when a power source voltage drop due to input impedance or a variation in power supply voltage occurs at the input of the system. In all of the depicted embodiments, constituent elements that are the same as those in FIG. 8 have been given the same reference numerals and the following description will center on the elements and functionality, which differ from those in FIG. 8.

The input voltage at a power converter 25 that supplies power to motor 27 is detected via a voltage detector 24. A control device 50 provides for control of motor in conformity with the detected voltage, permitting control device 50 to set a limit on the commanded torque that avoids control function saturation problems by providing a torque limit that varies with the detected input voltage. Further, control device 50 limits the torque command provided to converter 25 in correspondence with the input current of the power converter, preventing the input current from becoming excessive and avoiding current shutoff so that the motor can be operated continuously.

Within control device 50, a detected input voltage value provided by voltage detector 24 is sent to a torque command limit value generating part 5. Torque command limiter 6 receives a torque command limit value from torque command limit value generating part 5 and limits a torque command value provided by the torque command calculating part 2 to the torque command limit value. The limited torque command value is sent to a multiplier 8 serving as a torque command protection calculating part.

Torque command coefficient generating part 7 generates a torque command coefficient corresponding to the input current of power converter 25, and the torque command coefficient generated by generating part 7 is multiplied with the torque command value the multiplier 8 and the result is sent to an output calculating part 1. Output calculating part 1 uses the detected input voltage value provided by voltage detector 24, a detected position value from an encoder 4 and the output of the multiplier 8 to generate an output signal. The above-mentioned output signal is then used to drive a semiconductor switching device of the power converter 25, which is an inverter or the like.

The input current of the power converter 25 sent to the torque command coefficient generating part 7 may be a detected value or may be obtained by calculation from the input power (or output power and efficiency) and input voltage of the power converter 25.

From the equations $V_1=V_0-R\cdot I$ and $P=I\cdot V_1=I(V_0-R\cdot I)$, where $V_0$ is the output voltage of DC power supply 21, I is the input current of power converter 25 and R is the value of the input impedance 22, it can be seen that if the output power P of power converter 25 is constant, when a voltage drop caused by input impedance 22 makes input voltage $V_1$ of the power converter 25 lower than the output voltage $V_0$ of DC power supply 21, the input current I of the power converter 25 increases.

If the drop in the input voltage $V_1$ is marked, input current I increases and rises above the set value of the circuit breaker 23, and the circuit is broken by circuit breaker 23 and motor 27 stops. When the input impedance 22 is large and the voltage drop is large, because the maximum power $P_{max}=V_0^2/4R$ decreases, and even if the input current I increases the maximum output power specification cannot be met.

Figure 2:
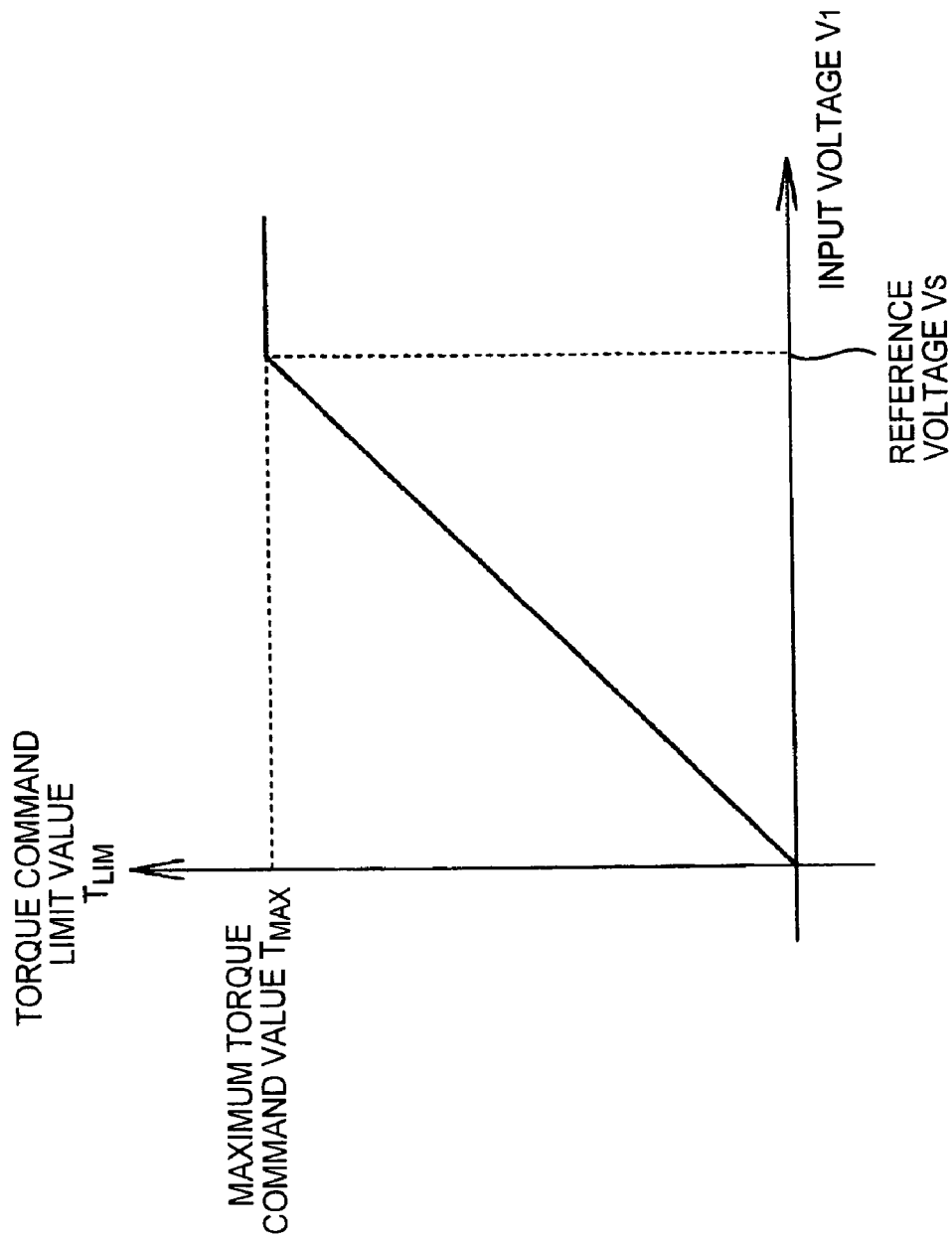
FIG. 2 is a graph depicting operation of torque command limit generator in the motor control system of FIG. 1.

The present invention avoids the above-described problem by the action of torque command limit value generating part 5 and torque command limiter 6, which reduce the motor torque in correspondence with the drop in the DC power supply voltage $V_0$ and/or the input voltage $V_1$. When motor 27 is being driven at a constant speed the output power P is proportional to the torque, and the output power P of the power converter 25 is limited as shown in FIG. 2. Torque command limit value generating part 5 generates a torque command limit value $T_{Lim}$ on as $T_{Lim}=(T_{max}/V_S)V_1$ using a preset reference voltage $V_S$, a preset maximum torque command value $T_{max}$ of times of maximum output, and the detected input voltage value $V_1$. Here, the reference voltage $V_S$ is set in consideration of the rated voltage of the motor 27, and the maximum torque command value $T_{max}$ is set for example as the torque value at the maximum output rating.

Torque command limiter 6 performs limit processing on the torque command value on the basis of the torque command limit value $T_{Lim}$. In this manner, even when the input voltage $V_1$ of the power converter 25 drops, a torque command value is applied within the range of power which can be provided at any given time. Also, as motor 27 is driven with a limited torque command value, the detected output current value of the power converter 25 follows the output current command value and the power control system does not become saturated. Therefore a responsiveness of current control comparable to that available when input voltage $V_1$ has not fallen can be maintained.

Further, the torque command limited by torque command limiter 6 is multiplied by the torque command coefficient generated by torque command coefficient generating part 7 by multiplier 8. If the input voltage $V_1$ of power converter 25 falls while and motor 27 is accelerating, if input current I is close to the cutoff current value of circuit breaker 23, the likelihood that the input current I will rise above the cutoff current value is high. Thus, the probability of the circuit being broken also increases.

To avoid current cut-off, in the present embodiment a torque command coefficient $C_I$ corresponding to the input current I is calculated by torque command coefficient generating part 7. The coefficient $C_I$ is then multiplied by the limited torque command value to adjust the limited torque command value.

Figure 3:
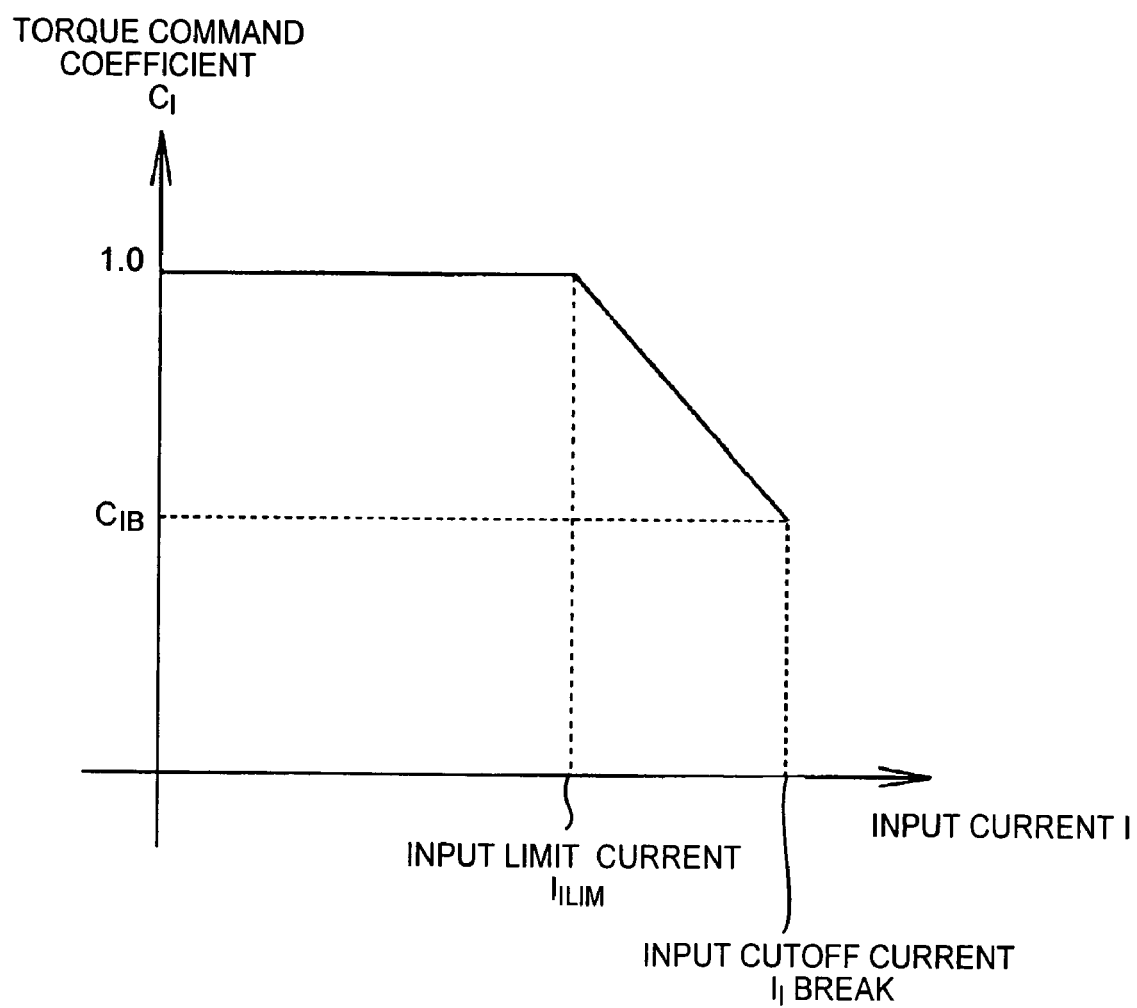
FIG. 3 is a graph depicting operation of torque command coefficient generator in the motor control system of FIG. 1.

The operation of torque command coefficient generating part 7 is depicted graphically in FIG. 3. Torque command coefficient generating part 7 calculates a torque command coefficient $C_I$ using an input cutoff current value $I_{I\ break}$. $I_{I\ break}$ is set in correspondence with: the trip level of circuit breaker 23, an input limit current value $I_{I\ Lim}$ is set at a certain margin lower than $I_{I\ break}$, and the input current I.

When input current I is below the input limit current value $I_{I\ Lim}$, torque command coefficient $C_I$ is set to 1 and when the input current I has risen above the input limit current value $I_{I\ Lim}$, in conformity with the input current I a torque command coefficient $C_I$ that assumes a set value $C_{I\ b}$ at the input cutoff current value $I_{I\ break}$ is generated. Accordingly, a value not greater than the limited torque command value is always generated. By applying a limit to the torque command value in conformity with the input current I, it is possible to prevent the input current I from rising above the cutoff current value and prevent the circuit from being broken during motor acceleration, thereby providing continuous operation of motor 27.

Figure 4:
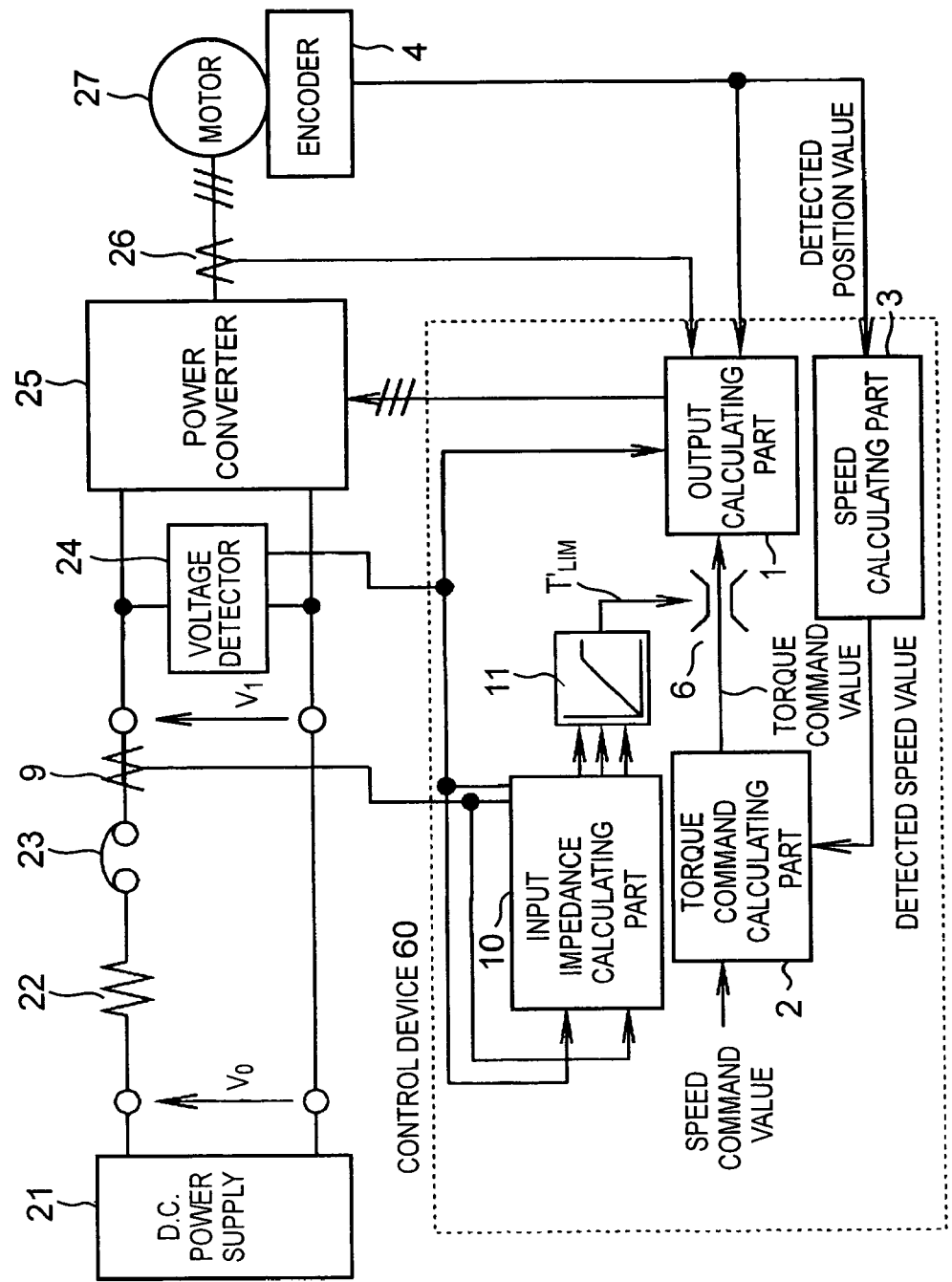
FIG. 4 is a block diagram depicting a motor control system in accordance with another embodiment of the present invention.

Referring now to FIG. 4, a block diagram showing another embodiment of the invention is shown. In the depicted embodiment, a current detector 9 for detecting the input current of power converter 25 is provided in the main Further, the maximum output value $P_{max}$ of power converter 25 is $P_{max}=(V_1+I\cdot R)^2/4R$. Therefore, by using the input impedance value R, the detected input voltage value $V_1$ and the detected input current value I, it is possible to calculate the maximum output value $P_{max}$ for any condition. In advance of actual operation, the motor 27 is tested driven in a high-load state and in a no-load state, and using the detected input voltage values and the detected input current values of those states, input impedance calculating part 10 calculates the input impedance value R from the expression above and stores it.

Maximum torque command limit value generating part 11 uses $P_{max}=(V_1+I\cdot R)^2/4R$ to calculate the maximum output value $P_{max}$ at that time from the input impedance value R and the detected input voltage value $V_1$ and the detected input current value I and outputs a maximum torque command limit value $T'_{Lim}$ on the basis of the following conditional expressions.

$$T'_{Lim}=(T'_{max}/P_{Lim})P_{max}(P_{max}<P_{Lim})$$

$$T'_{Lim}=T'_{max}(P_{max}\geq P_{Lim})$$

power circuit. Also, control device 60 further includes an input impedance calculating part 10, for obtaining an input impedance value from detected values of the input current and the input voltage of the power converter 25. Control device 60 also includes a maximum torque command limit value generating part 11, for generating a maximum torque command limit value from the detected values of the input current and the input voltage and from the input impedance value. A maximum torque command limit value generated by maximum torque command limit value generating part 11 is applied to torque command limiter 6.

Since $V_1=V_0-R\cdot I$ as pointed out above, when the voltage value of DC power supply 21 is constant, its output voltage $V_0$ can be expressed by $V_0=V_{1H}+I_{1H}\cdot R=V_{1L}+I_{1L}\cdot R$. $V_{1H}$ is a detected input voltage value and $I_{1H}$ is a detected input current value measured when the output P of the power converter 25 is high. $V_{1L}$ is a detected input voltage value and $I_{1L}$ is a detected input current value measured when the output of the power converter 25 is low. The input impedance value R can therefore be expressed as $R=(V_{1L}-V_{1H})/(I_{1H}-I_{1L})$.

Figure 5:
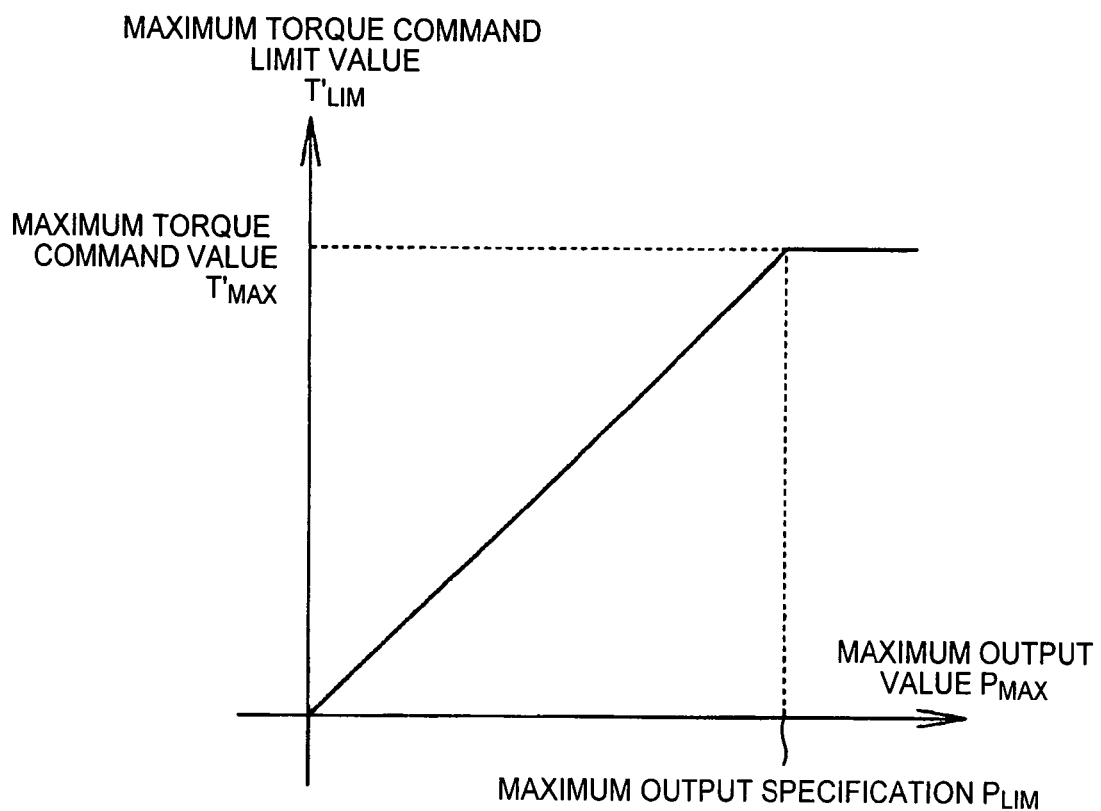
FIG. 5 is a graph depicting operation of torque command limit generator in the motor control system of FIG. 4.

FIG. 5 is a graph illustrating operation of maximum torque command limit value generating part 11, in which the maximum torque command value T'$_{max}$ is the torque value at, for example, the maximum output specification P$_{Lim}$. Torque command limiter 6 limits the torque command value on the basis of this maximum torque command limit value T'$_{Lim}$ and outputs a post-limiting torque command value to output calculating part 1.

In the embodiment of FIG. 4, by calibrating high-output operation and low-output operation of power converter 25 to obtain an input impedance value R in advance, torque control can be performed on the basis of the maximum output value P$_{max}$ at that time. The above calibration ensures that torque can be controlled even when the input voltage of power converter 25 falls. Also, because motor 27 is driven by a limited torque command value, the detected output current value follows the output current value, the current control system does not become saturated, and the same current responsiveness as when the input voltage has not fallen can be maintained.

Figure 6:
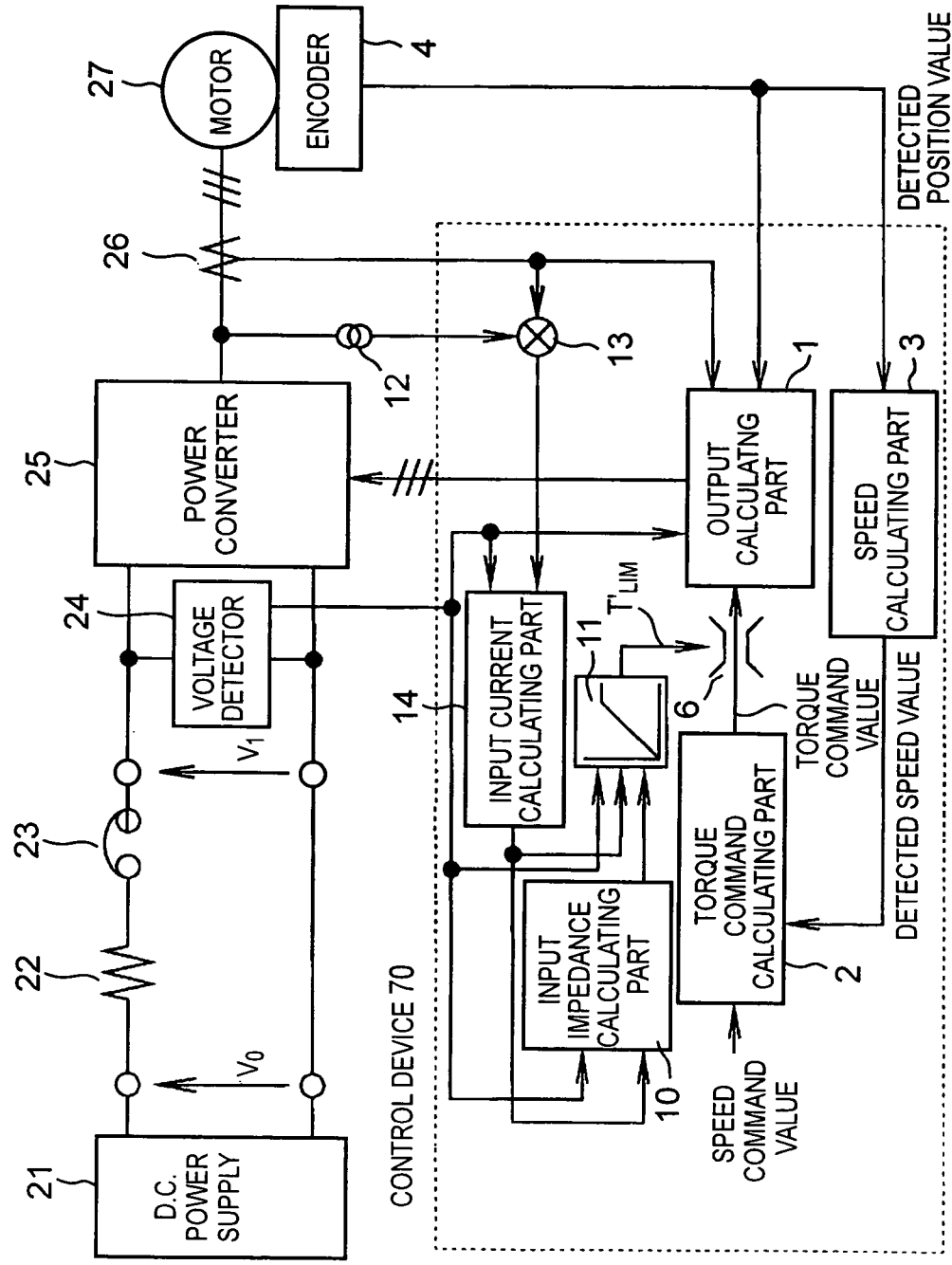
FIG. 6 is a block diagram depicting a motor control system in accordance with yet another embodiment of the present invention.

Referring now to FIG. 6, a block diagram showing a yet another embodiment of the invention is shown. The present embodiment differs from the previous embodiment in that the input current of power converter 25 is calculated from the input voltage and output power of power converter 25. A control device 70 has an input current calculating part 14, the input voltage of power converter 25 is detected by a voltage detector 24 and the output of a multiplier 13 serving as an output power calculating part are supplied to input power calculating part 14. Multiplier 13 multiplies the output voltage of power converter 25 detected by a voltage detector 12 and an output current detected by a current detector 26, and thereby calculates an output power value P$_{out}$ of power converter 25.

The relationship between the input power P$_{in}$ and the output power P$_{out}$ of power converter 25, using the efficiency η of the power converter 25, is given by P$_{out}$=η·P$_{in}$, and therefore the input current I of power converter can be obtained from $$I=P_{out}/(\eta \cdot V_1).$$

Input current calculating part 14 uses the output power P$_{out}$ from multiplier 13, the detected input voltage value from the voltage detector 24 and the known efficiency η to obtain a calculated input current value (estimated value) on the basis of the above expression. The efficiency η is obtained for example by referring to a table characterizing P$_{out}$/V$_1$.

Input impedance calculating part 10 calculates the input impedance value R from the above-mentioned calculated input current value and detected input voltage value as in the previous, and maximum torque command limit value generating part 11 generates a maximum torque command limit value T'$_{Lim}$. Torque command limiter 6 then limits the torque command value on the basis of the maximum output value P$_{max}$.

In the above-described manner, by estimating the input current from the output power and input voltage value of power converter 25, the torque can be limited to the maximum output value P$_{max}$ without using an input current detector 9 of the kind used in the embodiment of FIG. 4.

Figure 7:
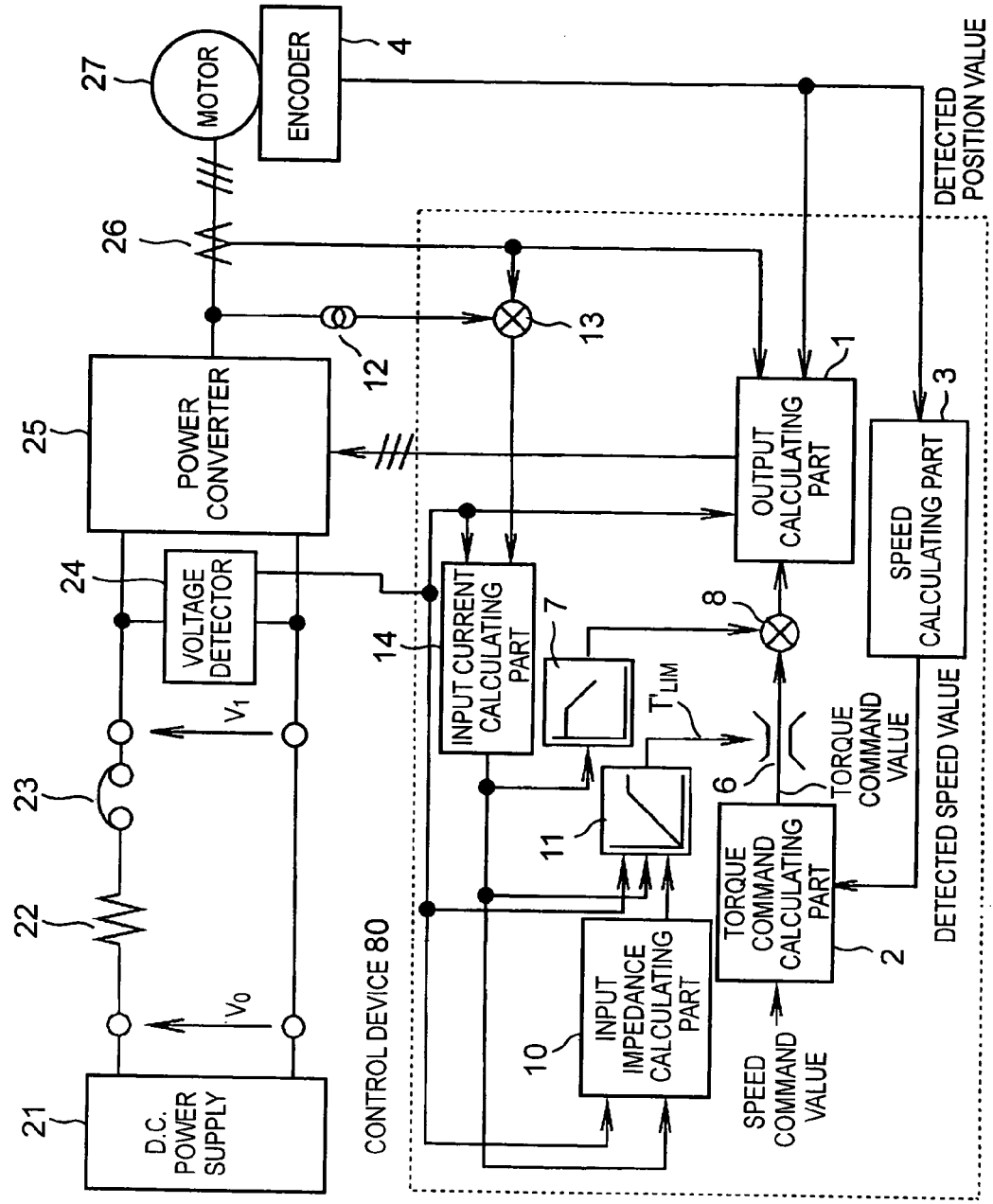
FIG. 7 is a block diagram depicting a motor control system in accordance with still another embodiment of the present invention.

Next, referring to FIG. 7, a block diagram showing still another embodiment of the invention is depicted. In the illustrated embodiment, in contrast to the embodiment of FIG. 6, a control device 80 is made by adding generating part 7 and multiplier 8 as present in the embodiment of FIG. 1.

As the operation of the system of FIG. 7 can be easily understood from descriptions of the systems of FIG. 1 and FIG. 6, a detailed description will not be given here. However, a brief description of the system of FIG. 7 follows.

A maximum torque command limit value T'$_{Lim}$ is generated by a maximum torque command limit value generating part 11 and then the torque command is limited on the basis of the maximum output value P$_{max}$ at that time. Torque command limiter 6 performs the limiting according to the maximum torque command limit value T'$_{Lim}$, in correspondence with a calculated input current value. A generating part 7 generates a predetermined torque command coefficient C$_I$ as described above with reference to FIG. 3, and the torque command coefficient C$_I$ is multiplied by the output of torque command limiter 6 to adjust the torque command value.

In the embodiment of FIG. 7, by adjusting (limiting) the torque command value in correspondence with a calculated input current value, the input current is prevented from becoming excessive. Circuit breaker 23 is also prevented from opening at times such as during motor acceleration, thereby making continuous operation of the motor 27 possible.

While the invention has been particularly shown and described with reference to the preferred embodiments thereof, it will be understood by those skilled in the art that the foregoing and other changes in form, and details may be made therein without departing from the spirit and scope of the invention.

This application incorporates by reference the entire disclosure of Applicant's corresponding Japanese priority application no. 2003-299792, filed Aug. 25, 2003

What is claimed is:

1. A motor control system, comprising:
    a power converter for supplying power to drive a motor, said power converter having a DC power input and a control input;
    a voltage detector coupled to said DC power input, for detecting an input voltage of said power converter; and
    a control circuit having a torque command output coupled to said control input of said power converter for controlling a torque of said motor, and having an input coupled to an output of said voltage detector, wherein said control circuit generates a torque command limit value in conformity with said detected input voltage and a predetermined reference voltage value and limits said torque of said motor by limiting said torque command output to said torque command limit value, wherein said control circuit generates a torque command coefficient in conformity with an input current of said power converter and multiplies said limited torque command output by said torque command coefficient.

2. The motor control system of claim 1, further comprising a current detector for detecting said input current of said power converter and having an output coupled to said control circuit, whereby said control circuit computes said torque command in conformity with said detected input current.

3. The motor control system of claim 1, further comprising a current detector for detecting an output current of said power converter and having an output coupled to said control circuit, and wherein said control circuit computes said input current of said power converter from said detected output current, whereby said control circuit computes said torque command in conformity with said computed input current.

4. A motor control system, comprising:
a power converter for supplying power to drive a motor, said power converter having a DC power input and a control input;
a voltage detector coupled to said DC power input, for detecting an input voltage of said power converter;
a current detector coupled to an input of said power converter for detecting an input current of said power converter; and
a control circuit having a torque command output coupled to said control input of said power converter for controlling a torque of said motor, and having an input coupled to an output of said voltage detector and a second input coupled to an output of said current detector, wherein said control circuit calculates an input impedance between said input of said power converter and a power supply in conformity with said detected input current and said detected input voltage of said power converter, and wherein said control circuit generates a maximum torque command limit value in conformity with said detected input voltage, said detected input current and said calculated impedance value and limits said torque of said motor by limiting said torque command output to said maximum torque command limit value.

5. The motor control system of claim 4, wherein said control circuit generates a torque command coefficient in conformity with an input current of said power converter and multiplies said limited torque command output by said torque command coefficient.

6. A motor control system, comprising:
a power converter for supplying power to drive a motor, said power converter having a DC power input and a control input;
a voltage detector coupled to said DC power input, for detecting an input voltage of said power converter;
a control circuit having a torque command output coupled to said control input of said power converter for controlling a torque of said motor, and having an input coupled to an output of said voltage detector, wherein said control circuit calculates an input current of said power converter, wherein said control circuit calculates an input impedance between said input of said power converter and a power supply in conformity with said calculated input current and said detected input voltage of said power converter, and wherein said control circuit generates a maximum torque command limit value in conformity with said detected input voltage, said calculated input current and said calculated impedance value and limits said torque of said motor by limiting said torque command output to said maximum torque command limit value.

7. The motor control system of claim 6, wherein said control circuit generates a torque command coefficient in conformity with an input current of said power converter and multiplies said limited torque command output by said torque command coefficient.

8. The motor control system of claim 6, further comprising a current detector for detecting an output current of said power converter and having an output coupled to said control circuit, and wherein said control circuit computes said input current of said power converter from said detected output current.

9. A method for controlling a motor, comprising:
supplying power to said motor from a converter that converts a DC voltage to a motor output;
controlling a torque of said motor by controlling said converter in conformity with a torque command;
detecting an input voltage at an input of said converter;
generating a torque command limit value in conformity with said detected input voltage and a predetermined reference voltage value;
limiting said torque of said motor by limiting said torque command output to said torque command limit value;
generating a torque command coefficient in conformity with an input current of said power converter; and
multiplying said a result of said limiting said torque command coefficient to provide said torque command.

10. The method of claim 9, further comprising detecting said input current of said converter.

11. A method for controlling a motor, comprising:
supplying power to said motor from a converter that converts a DC voltage to a motor output;
controlling a torque of said motor by controlling said converter in conformity with a torque command;
detecting an input voltage at an input of said converter;
detecting an input current of said converter;
calculating an impedance between said converter and a power supply in conformity with said detected input current and said detected input voltage;
generating a maximum torque command limit value in conformity with said detected input voltage, said detected input current and said calculated impedance; and
limiting said torque of said motor by limiting said torque command output to said maximum torque command limit value.

12. he method of claim 11, further comprising:
generating a torque command coefficient in conformity with said input current of said power converter; and
multiplying a result of said limiting said torque command coefficient to provide said torque command.

13. A method for controlling a motor, comprising:
supplying power to said motor from a converter that converts a DC voltage to a motor output;
controlling a torque of said motor by controlling said converter in conformity with a torque command;
detecting an input voltage at an input of said converter;
calculating an input current of said converter;
calculating an impedance between said converter and a power supply in conformity with said calculated input current and said detected input voltage;
generating a maximum torque command limit value in conformity with said detected input voltage, said detected input current and said calculated impedance; and
limiting said torque of said motor by limiting said torque command output to said maximum torque command limit value.

14. The method of claim 13, further comprising:
generating a torque command coefficient in conformity with said input current of said power converter; and
multiplying a result of said limiting said torque command coefficient to provide said torque command.

* * * * *

UNITED STATES PATENT AND TRADEMARK OFFICE
CERTIFICATE OF CORRECTION

| | | |
|---|---|---|
| PATENT NO. | : 7,042,181 B2 | Page 1 of 1 |
| APPLICATION NO. | : 10/923087 | |
| DATED | : May 9, 2006 | |
| INVENTOR(S) | : Takayuki Nagakura | |

It is certified that error appears in the above-identified patent and that said Letters Patent is hereby corrected as shown below:

Column 10, Line 35: Delete "he" and replace it with --The--.

Signed and Sealed this

Seventh Day of November, 2006

JON W. DUDAS
*Director of the United States Patent and Trademark Office*